United States Patent
Pattabhi et al.

(10) Patent No.: US 7,979,410 B2
(45) Date of Patent: Jul. 12, 2011

(54) MAINTAINING REFERENTIAL INTEGRITY WHILE MASKING

(75) Inventors: Ravi Pattabhi, Stow, MA (US); Harish Akali, Merrimack, NH (US); Luming Han, Allston, MA (US); Xiaolan Shen, Nashua, NH (US); Andrew Bodge, Acton, MA (US)

(73) Assignee: Oracle International Corp., Redwood Shores, CA (US)

( * ) Notice: Subject to any disclaimer, the term of this patent is extended or adjusted under 35 U.S.C. 154(b) by 418 days.

(21) Appl. No.: 12/221,157

(22) Filed: Jul. 30, 2008

(65) Prior Publication Data

US 2010/0030795 A1 Feb. 4, 2010

(51) Int. Cl.
*G06F 17/30* (2006.01)
(52) U.S. Cl. ...................................................... 707/705
(58) Field of Classification Search ............. 707/2, 100, 707/705; 713/189
See application file for complete search history.

(56) References Cited

U.S. PATENT DOCUMENTS

| | | | |
|---|---|---|---|
| 2006/0015514 A1* | 1/2006 | Suga | 707/100 |
| 2007/0208692 A1* | 9/2007 | Martinez et al. | 707/2 |
| 2008/0065665 A1* | 3/2008 | Pomroy et al. | 707/101 |
| 2008/0082834 A1* | 4/2008 | Mattsson | 713/189 |
| 2009/0024565 A1* | 1/2009 | Wong | 707/2 |

* cited by examiner

*Primary Examiner* — Etienne P LeRoux
(74) *Attorney, Agent, or Firm* — Kraguljac & Kalnay, LLC

(57) ABSTRACT

Systems, methods, and other embodiments associated with maintaining referential integrity while masking database columns are described. One example method includes determining a transitive closure for dependency relationships involving a column to be masked and other columns related to the column to be masked through a dependency relationship. The example method may also include identifying a root column for a column in the transitive closure and creating a mapping table that stores original values and masking values for the root column. The method includes masking the root column and related child columns based on the mapping table in a manner that maintains referential integrity between the root column and the child column. Integrity may be maintained by masking corresponding values in the root column and a child column(s) with identical mask values from the mapping table.

20 Claims, 7 Drawing Sheets

MAINTAINING REFERENTIAL INTEGRITY WHILE MASKING

COPYRIGHT NOTICE

A portion of the disclosure of this patent document contains material that is subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Databases may store sensitive information. Some users may be allowed access to sensitive information while other users may not be allowed access to sensitive data. An organization may have both production databases and databases that are used for testing and development. Testing and development systems may be required (e.g., by law, by policy) to not store any sensitive information. Conventionally, production database data may have been masked to prevent unauthorized or undesired presentation of sensitive data. Similarly, testing and development systems may interact with masked data. However, testing and developing systems may require access to live data and/or data that conforms with certain requirements to improve the likelihood that the thing being tested and/or developed will integrate seamlessly with a production database. For example, to validate a certain type of credit card that has a sixteen digit identifier, a subset of the sixteen available digits may need to be "live" or unmasked to accurately test interactions between a test system and a credit card verification application. Thus, conventional masking may frustrate some testing and development operations.

Databases are generally organized into sets of tables. Some tables may refer to other tables using keys. Conventional masking may produce issues when a key, (e.g., primary key, foreign key) is masked. For example, masking live data with substitute data may compromise or destroy links between tables. By way of illustration, a value for an employee identifier may be a primary key in a first table and a foreign key in another table(s). If the real value for the employee identifier is changed during a masking process, then the referential integrity of the table(s) that relies on the value as a key may be destroyed. Additionally, masking data to prevent unauthorized or undesired display may be expensive in terms of processor cycles and/or clock time.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
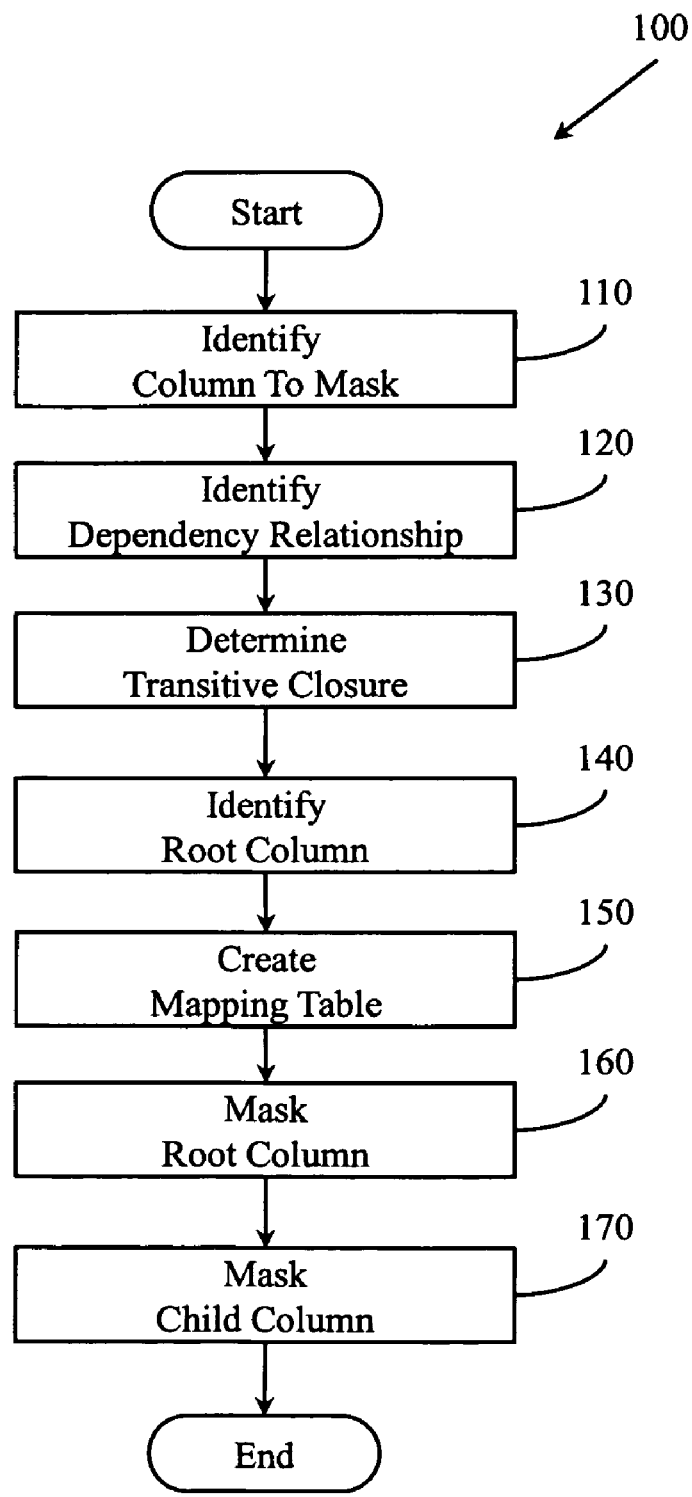
FIG. 1 illustrates an example method associated with masking data while maintaining uniqueness, primary key, foreign key, and application constraints.

Systems and methods associated with masking data in a database are provided. Example systems and methods facilitate maintaining referential integrity in the face of masking, even the masking of keys. Example systems and methods mask data in a manner that maintains uniqueness, primary key, foreign key, and application constraints. Thus, referential integrity is not destroyed by masking data.

Example systems and methods provide an efficient masking process that masks data while maintaining both implicit and explicit constraints in a database. In one example, the masking is performed entirely in the database in SQL (structured query language), which avoids fetching data into a client application to perform the masking. This "no-fetch" approach improves performance while offering the ability to mask any and all information in the database. Example systems and methods support a generic process by which data in a database can be masked without breaking applications that rely on the data in the database.

One example method includes the following actions. Information concerning a column(s) to be masked is received. The information may include an indication that a column is to be treated as a primary key, that the column is to be treated as a secondary key, that the column is to be treated as a foreign key, and so on. This information may be retrievable from a database in which a table associated with the column appears. Additionally, information concerning the format to be used to mask the column(s) is identified. For example, a column may be completely masked, may be bi-masked (e.g., partially masked, partially live), and so on. The column may be masked with random values, with unique values, with unique random values in a range, with "test" mask data from a masking file, and so on.

A database may have both explicitly defined constraints and implicitly defined constraints. Explicitly defined constraints may include, for example, primary key designations, foreign key designations, and so on, as described above. However, a database may also have implicitly defined constraints that are not retrievable from the database. Thus, the method may include receiving an identification of implicit constraints that are not declared in the database. The implicitly defined constraints may be associated with implicit referential integrity associated with, for example, applications that are using the database data. Explicitly declared constraints may then be determined from the information received about a column(s) to mask and with the information received about implicit constraints.

The method may then determine the transitive closure of columns that depend on the identified columns. "Transitive closure" of a tree refers to identifying all the nodes of a tree. The nodes may be related. These relationships may be represented in, for example, a directed graph. In one example, a column may be related to a primary key column that was identified as a column that is to be masked. A dependent column may be identified by querying the database on the identified columns to determine if there are dependent columns. The query may ask, for example, is the identified column a primary key, is the identified column a foreign key, and so on. The dependent column is identified so that referential integrity can be maintained. If a value in the primary key is going to be changed (e.g., masked), then a value in the dependent column may also be changed to preserve the key relationship. A column to be masked may have more than one dependent column and a dependent column may depend on more than one column. Thus, the method may cause the graph edges to be walked to determine whether there are cycles. The method may also cause the graph to be walked to determine that a node does not have multiple parents. These walks seek to establish that the graph is a tree. Ultimately, a complete map of the "trickle down" effect of masking a column that is a key can be determined.

This map will be examined to identify the "root" column for a masked column. A root column is a column from which other columns depend. If this root column is going to be masked, and/or if columns that depend from this root column are going to be masked, then there is the potential for referential integrity to be compromised. Therefore the method includes building a mapping table for a root column. The mapping table will store both the distinct set of original values and the new mask values. The mapping table will establish and maintain a relationship between an original value and a new mask value so that the new mask value may also be used to replace values corresponding to the original value in the root column. For example, a foreign key may be masked using the same value used to mask a corresponding primary key associated with a root column. The mask values for the mapping table may be generated using the format information received when the column was identified.

In one example, the mapping table may be built based on data acquired by querying an original database table for distinct values using a "create table as select" statement. In one example, the querying and creating can be performed with SQL parallelism in no-logging mode. In another example, the mapping tables may be built in parallel using a database management system (DBMS) job logic (e.g., dbms_job).

The method also includes masking a child column(s) related to the root column using the mapping table. Using the same mask value that masked the original value in the root column as the mask value for the corresponding value in the child column facilitates ensuring that explicit and/or implicit constraints are not violated. For example primary key relationships, foreign key relationships, and referential integrity may be maintained by replacing original identical related values with identical mask values and by making the original values selectively retrievable from a mapping table.

The method also includes masking an original database table(s) based, at least in part, on data available in the complete set of mapping tables. In one example, masking an original database table may include renaming a table that includes a mask column. Constraints and/or indexes associated with the table may also be renamed. Constraints on the table may then be dropped. Constraints referring to the table may then be dropped.

With the table renamed and constraints dropped, the table may then be recreated and populated. It may be populated by joining the renamed table and the mapping table(s) for a column(s) in the table that is being masked. Thus, if a column is not being masked its value may be selected from the original table in its backed up form and if the column is being masked its value may be picked up from the mapping table. In one example, the table recreation can be performed using a "create table as select" statement using SQL parallelism and also in non-logging mode for best performance. In one example, parallelism may be selectively enabled (e.g., for large tables) to minimize overhead.

With the tables populated, indexes and constraints may then be recreated. For example, indexes and constraints on the table may be recreated and then constraints that refer to the table may be recreated. A table may have additional items related to the table. For example, a table may have views, triggers, and other dependent objects. Therefore, in one example, the method may include recreating these views, triggers, and/or other dependent objects.

The method may perform the table constraint dropping and recreation for multiple tables to be masked. In one example, the constraint dropping and recreation may be performed in serial. In another example, the recreating may be done in parallel if constraints are dropped ahead of time for the tables to be recreated in parallel. In this case, a DBMS job may do the recreating in parallel and may then do the constraint recreation in parallel. This DBMS job approach facilitates achieving parallelism at an individual SQL level and also across tables. In one example the recreating may be performed in non-logging mode and thus rollback/redo overhead may not be incurred.

In one example, less than all the rows for a column may be masked. In this example, only selected rows are masked. In this example, non-logging mode may not be employed and thus rollback/redo overhead may still be incurred.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
EEPROM: electrically erasable PROM.
SQL: structured query language.
OQL: object query language.

USB: universal serial bus.

XML: extensible markup language.

WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with maintaining referential integrity between columns and/or tables in a database when one of the columns is masked. In one example, referential integrity between a root column and a child column is maintained by masking corresponding values in the root column and the child column with identical mask values from a mapping table. The values in the mapping table for use as mask values may be created according to a specified format. The format may be specified by a default, by a user-supplied format, by a process-controlled format, and so on. The mapping table is built for a root column. The root column is identified as the ultimate ancestor of columns related to each other, either directly and/or indirectly, through dependency relationships. A mask value for a value in the root column may be generated. The root column may store a key value or a value associated with a constraint. The mask value may be applied to the root column and then be used to mask not only the root column but also other columns that store the same value. A mapping between the original value and the masked value may be maintained in the mapping table. Thus, a masked version of sensitive data, even data employed as keys, may be provided while maintaining referential integrity.

Method 100 may include, at 110, identifying a column to be masked in a database table. In one example, identifying a column to be masked in a database table includes receiving a column identifier. The column identifier may be received, for example, from a user through a graphical user interface, from an application, from a logic or process, and so on. In one example, identifying a column to be masked also includes receiving information describing how the column to be masked is to be masked. This information may include, for example, a range of valid values, an identifier of whether unique values are to be used, a format for the masking data, and so on.

Method 100 may also include, at 120, identifying a dependency relationship between the column to be masked and a second column(s) upon determining that the second column (s) depends on the column to be masked. The second column may appear in the same database table, in a different database table, and so on. While a single second column is described, it is to be appreciated that multiple columns may depend on the column to be masked. In one example, determining that a second column depends on the column to be masked includes querying a database in which the database table appears. The query may identify that the column operates as a primary key, a secondary key, a foreign key, and so on.

Method 100 may also include, at 130, determining a transitive closure for dependency relationships involving the column to be masked, the second column, and other columns related to the column to be masked through a dependency relationship. Recall that the dependency relationships may be indirect and/or indirect. A direct relationship relates a first column to a second column using, for example, a foreign key. An indirect relationship relates a first column to a second column through, for example, a set of other columns in other tables that may represent a chain of foreign keys. While foreign keys are described, it is to be appreciated that primary keys, foreign keys, secondary keys, constraints, and so on may produce dependency relationships between columns. Additionally, a single column to be masked may have dependency relationships with multiple columns. In one example, the transitive closure may be represented as a directed graph whose nodes are described using XML attribute:value pairs.

Method 100 may also include, at 140, identifying a root column for a column in the transitive closure. Identifying the root column in the transitive closure facilitates locating columns that may be affected by the masking of the identified column. Additional detail for identifying a root column is provided below in connection with FIG. 4.

Method 100 may also include, at 150, creating a mapping table that stores original values and masking values for the root column. The mapping table may be created according to pre-defined and/or supplied formats. For example, a mask format may have been provided for a column to be masked. A format for the root column may match the provided format, may be based on the provided format, may be derived from the provided format, and so on. The mapping table may be secured so that access may be limited to authorized viewers. In this way, a production database can be masked, even elements of the production database associated with keys, and yet a testing and/or development environment can have access to "pseudo-live" data where referential integrity and constraints are maintained. Consider the testing of a social security number module. Clearly a production database with actual social security numbers can not be used to test the module. Conventionally, masking a social security number may have created issues with referential integrity and constraints since a social security number may have functioned as a key into many related tables. Example systems and methods facilitate providing unique masked values for social security numbers while maintaining relationships between tables and maintaining constraints. Thus, a test system can operate on all tables in a database, not just special test tables, and thus produce a superior testing environment.

Method 100 may also include, at 160, masking the root column based, at least in part, on the mapping table. Additional detail for masking a root column is provided below in connection with FIG. 5. Masking the root column may include querying the mapping table, copying data from the mapping table, selectively copying data from the mapping table, and so on.

Method 100 may also include, at 170, masking a child column of the root column based, at least in part, on the mapping table. While a "child" of the root column is described, one skilled in the art will appreciate that a "descendant" of the root column may be masked. The descendant may be a direct descendant (e.g., child), or an indirect descendant (e.g., grandchild). Before the descendant column is masked, constraints associated with the child column may be dropped. After the constraints are dropped, data in the child column may be selectively replaced with data from the mapping table and/or data from an original version of the table in which the child column appeared. Once the child column has been masked, constraints associated with the child column may be recreated. In one example, child columns may be populated in parallel and constraints may be recreated in parallel. To facilitate parallel child masking and constraint handling, constraints may be dropped for more than one child table at a time.

While FIG. 1 illustrates various actions occurring in serial, it is to be appreciated that various actions illustrated in FIG. 1 could occur substantially in parallel. By way of illustration, a first process could identify a column to mask, identify dependency relationships and determine a transitive closure of those dependency relationships. A second process could identify a root column in the transitive closure and create a mapping table. A third process could mask a root column and descendant columns. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 100. While executable instructions associated with method 100 are described as being stored on a computer-readable medium, it is to be appreciated that executable instructions associated with other example methods described herein may also be stored on a computer-readable medium.

Figure 2:
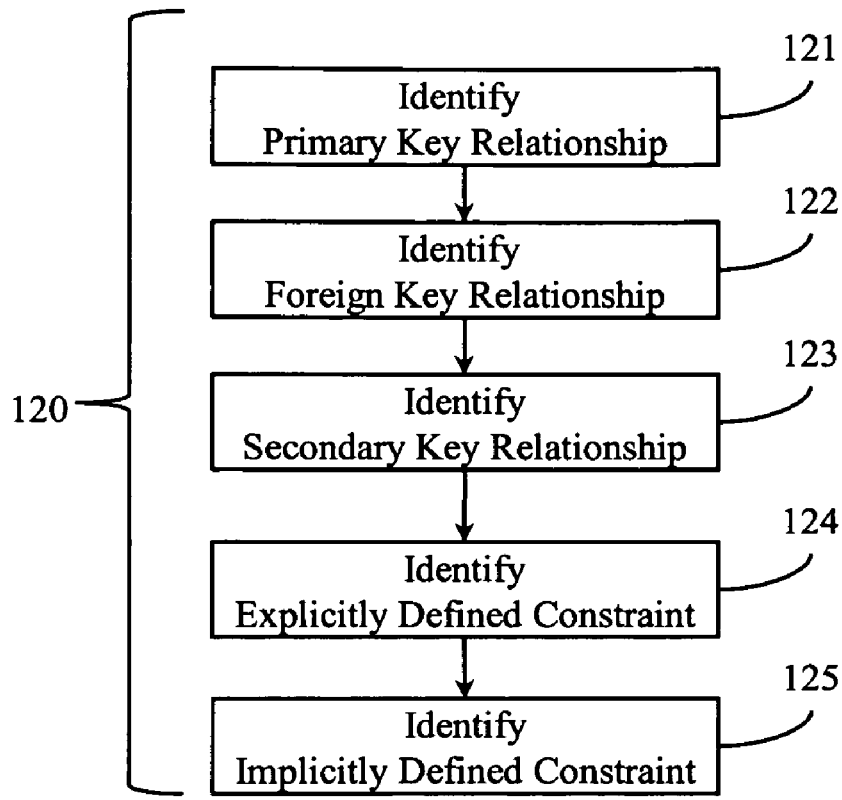
FIG. 2 illustrates a portion of an example method associated with masking data while maintaining uniqueness, primary key, foreign key, and application constraints.

FIG. 2 illustrates additional detail associated with element 120 of method 100. Recall that method 100 includes, at 120, identifying dependency relationships that involve, either directly or indirectly, the column to be masked. A column may be directly involved with the column to be masked if, for example, a value computed for the column depends on a value in the column to be masked, if the column is related to the column to be masked in a key relationship, and so on. A column may be indirectly involved with a column to be masked through a series of dependency relationships. Thus, determining that the second column depends on the column to be masked may include, at 121, identifying a primary key relationship involving the second column and the column to be masked. Determining that the second column depends on the column to be masked may also include, at 122, identifying a foreign key relationship involving the second column and the column to be masked. Determining that the second column depends on the column to be masked may also include, at 123, identifying a secondary key relationship involving the second column and the column to be masked. Determining that the second column depends on the column to be masked may also include, at 124, identifying an explicitly defined constraint between the second column and the column to be masked. Determining that the second column depends on the column to be masked may also include, at 125, identifying an implicitly defined constraint between the second column and the column to be masked. While five examples are provided, one skilled in the art will appreciate that other dependency relationships may be identified using other approaches. In different examples, an explicitly defined constraint may be defined in a database associated with the database table and/or in an application associated with the database table. Additionally, an implicitly defined constraint may be inferable from a database associated with the database table and/or and an application associated with the database table.

Figure 3:
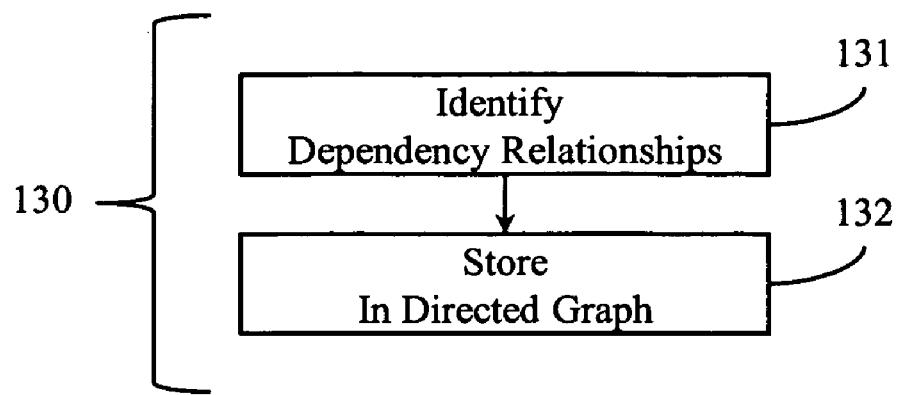
FIG. 3 illustrates a portion of an example method associated with masking data while maintaining uniqueness, primary key, foreign key, and application constraints.

FIG. 3 illustrates additional detail associated with element 130 of method 100. Recall that method 100 included, at 130, determining a transitive closure of the dependency relationships. One skilled in the art will understand that "transitive closure", as applied to a directed graph G=(V,E), where V is the set of vertices and E is the set of edges, refers to a graph G+=(V,E+) such that for all v,w in V there is an edge (v,w) in E+ if and only if there is a non-null path from v to w in G. Thus, method 100 may include, at 131, identifying the dependency relationships associated with the column to mask and, at 132, storing information concerning the dependency relationships in a directed graph.

Figure 4:
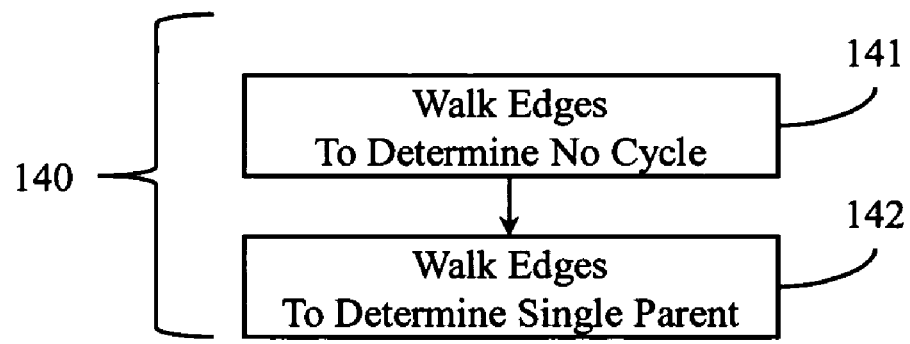
FIG. 4 illustrates a portion of an example method associated with masking data while maintaining uniqueness, primary key, foreign key, and application constraints.

FIG. 4 illustrates additional detail associated with element 140 of method 100. Recall that method 100 includes, at 140, identifying a root column. In one example, identifying a root column for a column in the transitive closure includes, at 141, walking the edges of the directed graph to determine that the directed graph does not include a cycle. Additionally, identifying a root column may include, at 142, walking the directed graph to determine that a node in the directed graph has a single parent. When the directed graph includes no cycles and when nodes in the directed graph only include single parents, then method 100 may proceed to produce a mapping table at 150. If the directed graph includes a cycle and/or if a node includes more than a single parent, then a remedial action may be taken before producing a mapping table.

Figure 5:
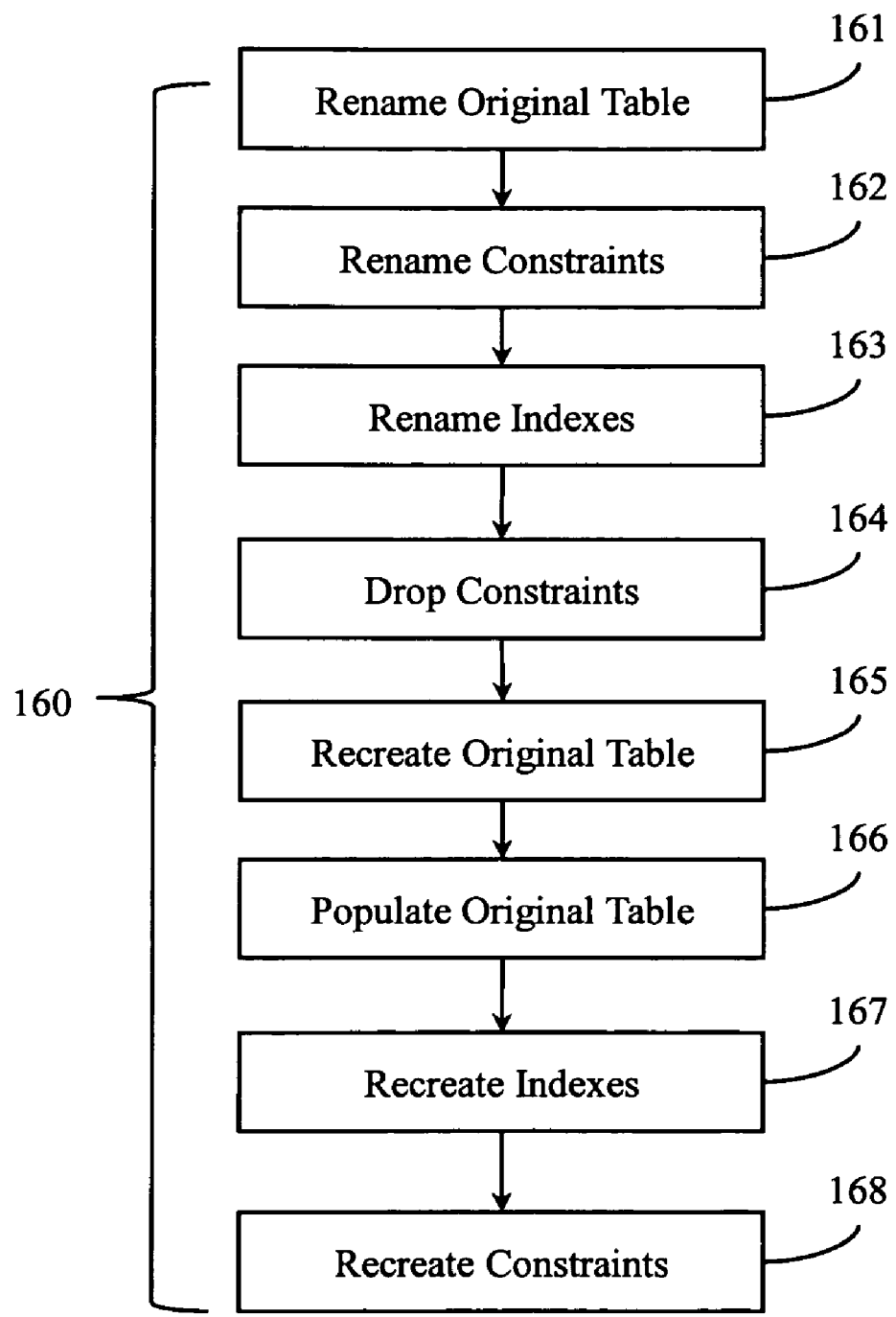
FIG. 5 illustrates a portion of an example method associated with masking data while maintaining uniqueness, primary key, foreign key, and application constraints.

FIG. 5 illustrates additional detail associated with element 160 of method 100. Recall that method 100 includes, at 160, masking a root column. The root column may be masked to allow viewing of the column and/or use of the column without revealing sensitive information. However, as described above, the column may be a key column and/or may be a column upon which other columns and/or applications depend. Thus, unlike conventional systems, the column may not be blindly masked. Instead, method 100 may include using the mapping table to mask the root column. This masking may include, at 161, renaming the original table to a renamed table. Once the original table has been renamed at 161, then constraints on the original table may also be renamed at 162. Similarly, indexes on the original table may be renamed at 163. With the table and its constraints renamed, constraints on the original table may be dropped at 164. Similarly, constraints referring to the original table may also be dropped at 164.

Actions 161 through 164 produce conditions under which a new table can be created. Thus, actions 165 through 168 describe recreating a table with masked values. For example, masking the original table may include, at 165, recreating the original table. Recreating the original table may be followed, at 166, by populating the original table from the renamed table and the mapping table. For example, data for a column that is not to be masked may be added to the newly recreated original table from the renamed table while data for a column that is to be masked may be added to the original table from the mapping table. In this way the new version of the table, the masked version of the table, may include both original data and masked data. Since the masked data is taken from the mapping table, that masked data is also available to mask other columns that are related to the just masked column by, for example, a key-based dependency relationship. After the table has been populated at 166, method 100 may continue, at 167, by recreating indexes on the original table. Similarly, method 100 may include, at 168, recreating constraints on the original table, and recreating constraints referring to the original table. In one example, masking the original table includes performing, in parallel, recreation of indexes on the original table, recreation of constraints on the original table, and recreation of constraints referring to the original table.

Figure 6:
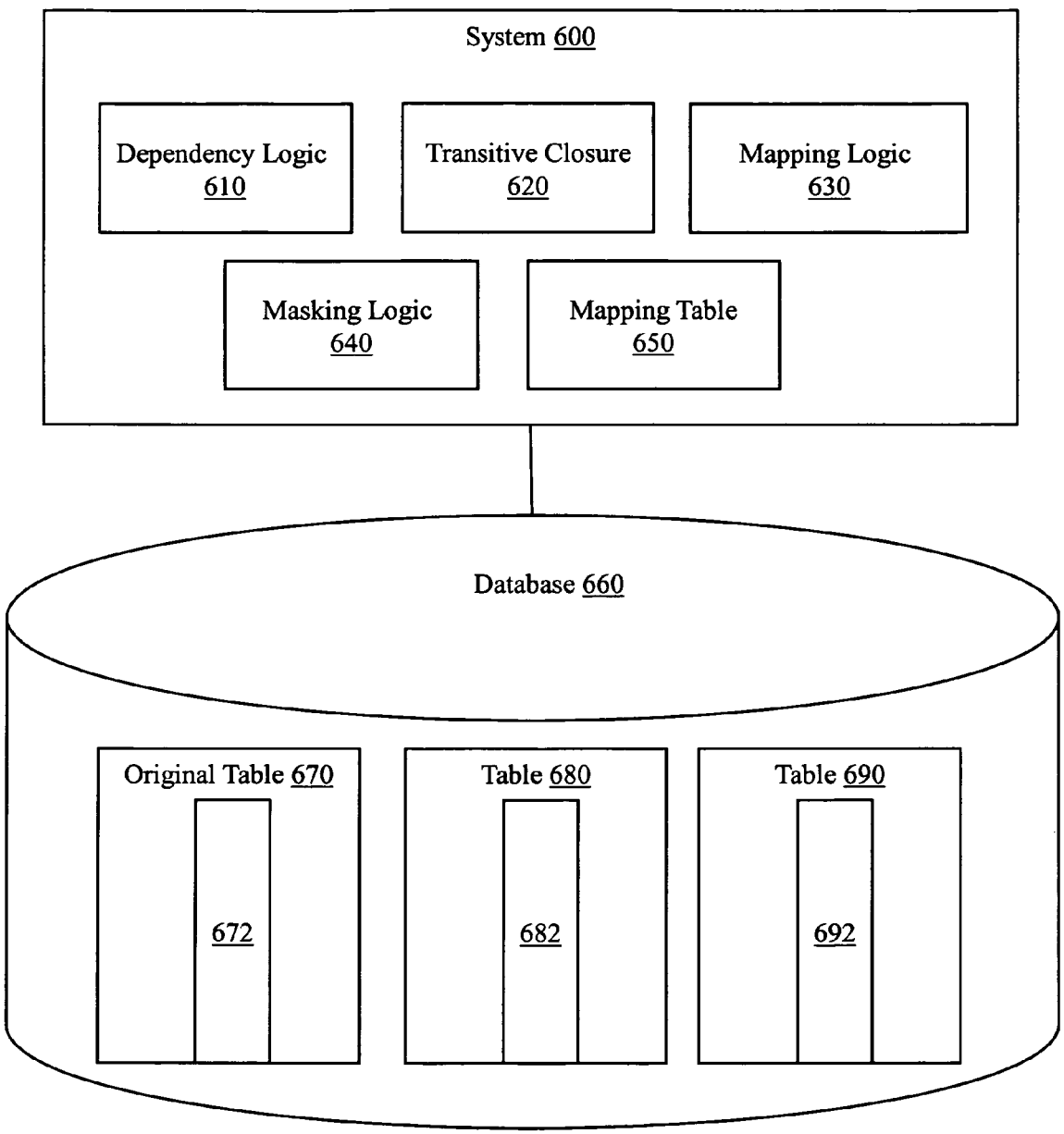
FIG. 6 illustrates an example system associated with masking data while maintaining uniqueness, primary key, foreign key, and application constraints.

FIG. 6 illustrates a system 600 associated with maintaining referential integrity between items in a database when at least one of the items is masked. System 600 includes a dependency logic 610. Dependency logic 610 may create a transitive closure 620 of dependency relationships involving a column to be masked 682 in a database table 680 in a database 660. The transitive closure 620 may be represented as, for example, a directed graph. The directed graph may be stored in a data store (e.g., file, table, database). The dependency relationships may include, for example, a primary key relationship, a secondary key relationship, a foreign key relationship, an explicitly defined constraint in a database, an explicitly defined constraint in an application, an implicitly defined constraint, and so on. The dependency logic 610 may manipulate the transitive closure 620 to insure that the transitive closure 620 includes no cycles and to insure that members of the transitive closure 620 have only single parents. While transitive closure 620 is illustrated inside system 600, one skilled in the art will appreciate that the transitive closure 620 may be stored outside system 600 yet still be available to system 600.

The dependency logic 610 may also identify a root column 672 in an original table 670. The root column 672 may be related to the column to be masked 682 by a dependency relationship (e.g., primary key, foreign key). While the column to mask 682 and the root column 672 are illustrated as being separate columns, one skilled in the art will appreciate that it is possible that the column to be masked 682 could be the same as the root column 672. Similarly, while the column to mask 682 appears in a table 680 and the root column 672 appears in a different table 670, it is to be appreciated that the two columns could appear in the same table. The transitive closure 620 may include information relating the column to mask 682 to the root column 672 and to other columns (e.g., column 692) related to the column to mask 682 and/or root column 672 by dependency relationships.

System 600 includes a mapping logic 630 to create a mapping table 650 that stores original values and masking values for the root column 672. Once again, while mapping table 650 is illustrated inside system 600, one skilled in the art will appreciate that the mapping table 650 may be stored outside system 600 yet still be available to system 600. System 600 also includes a masking logic 640 to mask the root column 670 and other columns identified in the transitive closure 620 as being related to the root column 672. The masking logic 640 may perform the masking based, at least in part, on the mapping table 650. For example, rather than randomly generate mask values, the masking logic 640 may acquire mask values that were placed in the mapping table 650 by the mapping logic 630. The mapping logic 630 may have created the mask values to facilitate maintaining referential integrity, uniqueness, and/or constraints based on information about the column to mask 682 and/or the root column 672. The masking logic 640 may maintain referential integrity between the root column 670 and other columns (e.g., column to mask 682, other column 692) by masking corresponding values in the root column 672 and other columns with related mask values from the mapping table 650. In one example, the masking logic 640 is to drop constraints on tables having columns identified in the transitive closure 620 before masking and is to perform the masking of the root column 672 and other columns in parallel.

Figure 7:
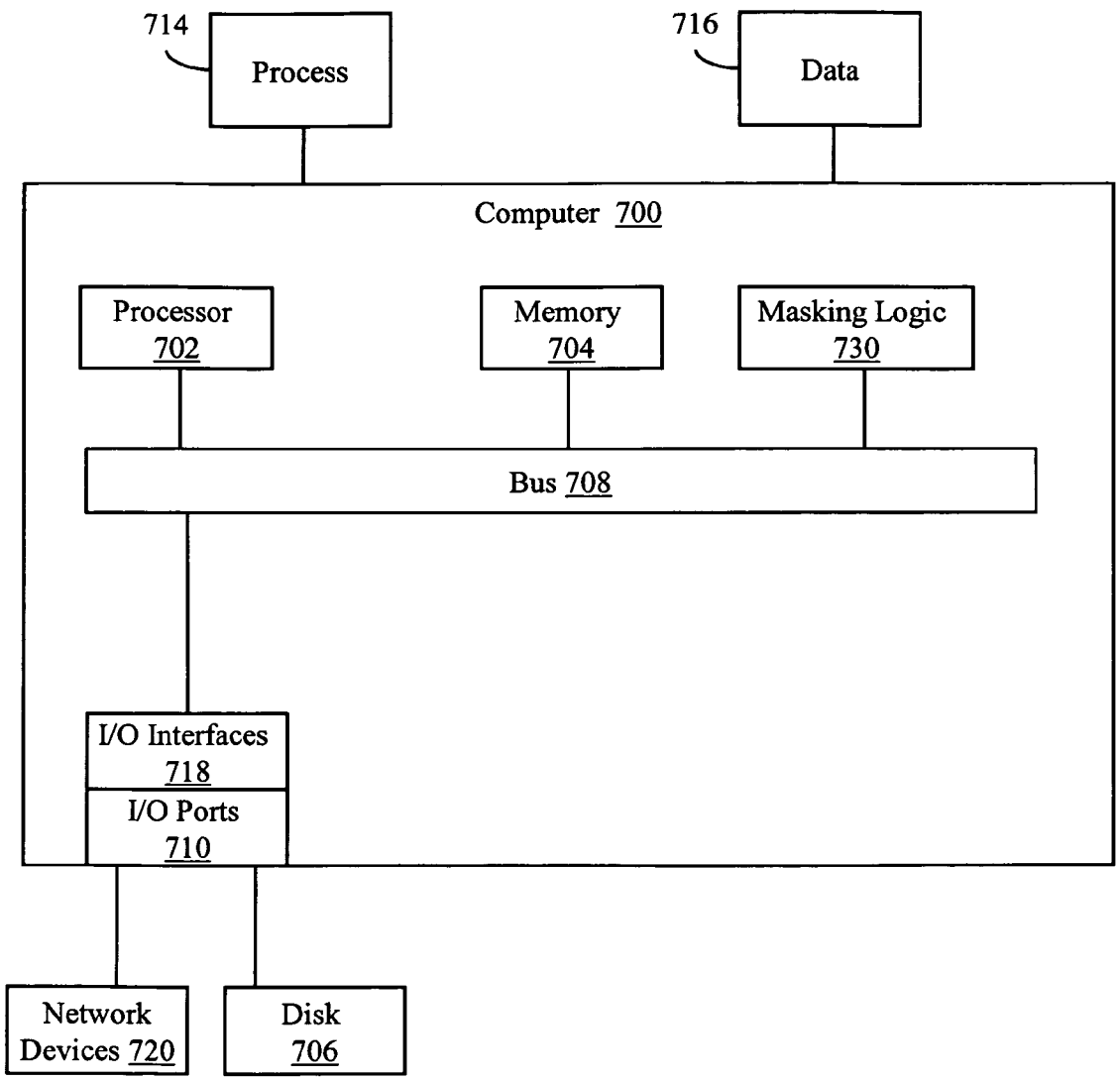
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a masking logic 730 configured to facilitate maintaining referential integrity, uniqueness, and/or constraints associated with items in a database when an item is masked. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, logic 730 may provide means (e.g., hardware, software, firmware) for determining that referential integrity between database tables may be affected by the masking of a column to be masked in a database. The logic 730 may, for example, query a database to discover relationships between columns. Logic 730 may also provide means (e.g., hardware, software firmware) for determining a root column associated with the column to be masked. Determining the root column facilitates appropriately masking not just a column identified to be masked but also other columns associated with that column through direct and/or indirect dependency relationships. Logic 730 may also provide means (e.g., hardware, software, firmware) for masking the root column and the column to be masked while maintaining referential integrity between the database tables. This referential integrity maintaining masking may be based, at least in part, on data available in a mapping table produced by logic 730. The means associated with logic 730 may be implemented, for example, as an ASIC programmed to control an otherwise general purpose computer. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM drive, a Blu-Ray drive, an HD-DVD drive, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, MB, AABB, AABBC, MBBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
   identifying a column to be masked in a database table;
   upon determining that a second column depends on the column to be masked, identifying a dependency relationship between the column to be masked and the second column;
   determining a transitive closure graph for dependency relationships involving the column to be masked, the second column, and other columns related to the column to be masked through a dependency relationship;
   identifying a root column for a column in the transitive closure graph;
   creating a mapping table that stores original values and masking values for the root column;
   masking the root column based, at least in part, on the mapping table; and
   masking a child column of the root column based, at least in part, on the mapping table;
   where referential integrity between the root column and the child column is maintained after masking by masking corresponding values in the root column and the child column with identical mask values from the mapping table.

2. The non-transitory computer-readable medium of claim 1, where determining that the second column depends on the column to be masked includes identifying one or more of, a primary key relationship involving the second column and the column to be masked, a foreign key relationship involving the second column and the column to be masked, a secondary key relationship involving the second column and the column to be masked, an explicitly defined constraint between the second column and the column to be masked, and an implicitly defined constraint between the second column and the column to be masked.

3. The non-transitory computer-readable medium of claim 2, where the explicitly defined constraint is defined in one or more of, a database associated with the database table, and an application associated with the database table.

4. The non-transitory computer-readable medium of claim 2, where the implicitly defined constraint is inferable from one or more of, a database associated with the database table, and an application associated with the database table.

5. The non-transitory computer-readable medium of claim 1, where identifying a column to be masked in a database table includes receiving a column identifier and includes receiving information describing how the column to be masked is to be masked.

6. The non-transitory computer-readable medium of claim 5, where determining that a second column depends on the column to be masked includes querying a database in which the database table is stored to identify that the column operates as one or more of, a primary key, a secondary key, and a foreign key.

7. The non-transitory computer-readable medium of claim 1, where determining a transitive closure includes identifying dependency relationships and storing information concerning dependency relationships as between the column to be masked, the second column, and other columns related to the column to be masked through a dependency relationship in a directed graph.

8. The non-transitory computer-readable medium of claim 7, where identifying a root column for a column in the transitive closure includes walking the edges of the directed graph to determine that the directed graph does not include a cycle and walking the directed graph to determine that a node in the directed graph has a single parent.

9. The non-transitory computer-readable medium of claim 1, where masking the root column includes masking an original table in which the root column appears.

10. The non-transitory computer-readable medium of claim 1, where masking the root column is performed entirely in SQL in a database associated with the database table.

11. The non-transitory computer-readable medium of claim 1, where masking the original table includes renaming the original table to a renamed table, renaming constraints on the original table, renaming indexes on the original table, dropping constraints on the original table, and dropping constraints referring to the original table.

12. The non-transitory computer-readable medium of claim 11, where masking the original table includes recreating the original table and populating the original table from the renamed table and the mapping table, where data for a column that is not to be masked is added to the original table from the renamed table, and where data for a column that is to be masked is added to the original table from the mapping table.

13. The non-transitory computer-readable medium of claim 12, where masking the original table includes recreating indexes on the original table, recreating constraints on the original table, and recreating constraints referring to the original table.

14. The non-transitory computer-readable medium of claim 13, where masking the original table includes performing, in parallel, recreation of indexes on the original table, recreation of constraints on the original table, and recreation of constraints referring to the original table.

15. The non-transitory computer-readable medium of claim 13, where masking a child column of the root column based, at least in part, on the mapping table, includes dropping constraints associated with the child column, selectively replacing data in the child column with data from the mapping table, and recreating constraints associated with the child column.

16. A system, comprising:
- a dependency logic embodied as a non-transitory computer readable medium storing computer-executable instructions that when executed by a computer cause the computer to create a transitive closure graph of dependency relationships involving a column to be masked in a database table and to identify a root column for the column to be masked;
- a mapping logic embodied as a non-transitory computer readable medium storing computer-executable instructions that when executed by a computer cause the computer to create a mapping table that stores original values and masking values for the root column; and
- a masking logic embodied as a non-transitory computer readable medium storing computer-executable instructions that when executed by a computer cause the computer to mask the root column and other columns in the transitive closure related to the root column where the masking is based, at least in part, on the mapping table;
- where referential integrity between the root column and the other columns is maintained after masking by masking corresponding values in the root column and the other columns with related mask values from the mapping table.

17. The system of claim 16, where the dependency relationships include one or more of, a primary key relationship, a secondary key relationship, a foreign key relationship, an explicitly defined constraint in a database, an explicitly defined constraint in an application, and an implicitly defined constraint.

18. The system of claim 16, where the transitive closure includes no cycles and where members of the transitive closure have single parents.

19. The system of claim 16, where the masking logic is to drop constraints on tables having columns identified in the transitive closure graph before masking and is to perform the masking of the root column and other columns in parallel.

20. A system, comprising:
- means for determining that referential integrity between database tables will be affected by the masking of a column to be masked in a database;
- means for determining a root column associated with the column to be masked; and
- means for masking the root column and the column to be masked while maintaining referential integrity between the database tables.

* * * * *

UNITED STATES PATENT AND TRADEMARK OFFICE
CERTIFICATE OF CORRECTION

| | | |
|---|---|---|
| PATENT NO. | : 7,979,410 B2 | |
| APPLICATION NO. | : 12/221157 | |
| DATED | : July 12, 2011 | |
| INVENTOR(S) | : Pattabhi et al. | |

It is certified that error appears in the above-identified patent and that said Letters Patent is hereby corrected as shown below:

In column 13, line 23, delete "MB," and insert -- AAB, --, therefor.

In column 13, line 24, delete "MBBCC," and insert -- AABBCC, --, therefor.

Signed and Sealed this
Fifteenth Day of November, 2011

David J. Kappos
*Director of the United States Patent and Trademark Office*